United States Patent
Weisband

(10) Patent No.: US 11,152,820 B2
(45) Date of Patent: Oct. 19, 2021

(54) CHARGE SHARING BATTERY PACK FOR TELEPHONE

(71) Applicant: Douglas Weisband, San Diego, CA (US)

(72) Inventor: Douglas Weisband, San Diego, CA (US)

( * ) Notice: Subject to any disclaimer, the term of this patent is extended or adjusted under 35 U.S.C. 154(b) by 48 days.

(21) Appl. No.: 16/587,592

(22) Filed: Sep. 30, 2019

(65) Prior Publication Data

US 2020/0112205 A1   Apr. 9, 2020

Related U.S. Application Data

(60) Provisional application No. 62/742,026, filed on Oct. 5, 2018.

(51) Int. Cl.
  *H02J 50/40*  (2016.01)
  *H02J 7/00*  (2006.01)

(52) U.S. Cl.
  CPC .......... *H02J 50/402* (2020.01); *H02J 7/0045* (2013.01); *H02J 50/40* (2016.02)

(58) Field of Classification Search
  CPC ........................................................ H02J 7/025
  USPC ............................................................ 320/108
  See application file for complete search history.

(56) References Cited

U.S. PATENT DOCUMENTS

| | | | |
|---|---|---|---|
| 2015/0326053 A1* | 11/2015 | Amano | H02J 7/00 320/108 |
| 2016/0233711 A1* | 8/2016 | Miller | H02J 7/027 |
| 2018/0288204 A1* | 10/2018 | Nahum | A45F 5/10 |

* cited by examiner

*Primary Examiner* — Edward Tso
*Assistant Examiner* — Ahmed H Omar
(74) *Attorney, Agent, or Firm* — Law Office of Scott C Harris, Inc

(57) ABSTRACT

A dual wireless phone charger enables sharing charge to another users' phone. A battery can be connected to a first side wireless charger, facing in a first direction, a second side wireless charger, separated from the first side wireless charger and a battery and wireless charging circuit, providing power supplied by the battery, to both of the first side wireless charger and the second side wireless charger. One or both of the wireless chargers can be connected on a wire so it can be separated from the other.

9 Claims, 3 Drawing Sheets

CHARGE SHARING BATTERY PACK FOR TELEPHONE

This application claims priority from Provisional Application No. 62/742,026, filed Oct. 5, 2018, the entire contents of which are herewith incorporated by reference.

BACKGROUND

Portable batteries can be used charging cellular phones. These portable batteries are often called power banks. Typical power banks may provide enough capacity to charge a user's cell phone between 1 and 4 times.

Having a powered phone has become an important part of the user's daily life. Users find it very important to keep their phones charged at all times.

SUMMARY OF THE INVENTION

The inventor recognized that many power banks have more than enough power to charge not only the owner's phone, but also others. The inventor also recognized a new form of social interacting via sharing the charge on one's phone battery with others. In one embodiment, the charge can be shared from an external battery.

A specific embodiment described herein explains a special system for allowing wirelessly sharing charge between multiple telephone users, including a first user who has a source of charge such as a power bank, and a second user with whom the charge is shared.

An embodiment describes a wireless charger which can be used to charge two different cellular telephones at the same time. One embodiment describes this as a dual sided wireless charger. In one embodiment, this can be in the shape of a pop socket.

DETAILED DESCRIPTION

The present application describes a charge sharing battery system for use with, for example, a cellular phone. In an embodiment, the charge is shared by using a wireless charge sharing device, such as a wireless charger. The inventor contemplates, however, that this same system can be used for charging of different devices, and can be used with charging formats other than wireless.

Figure 1:
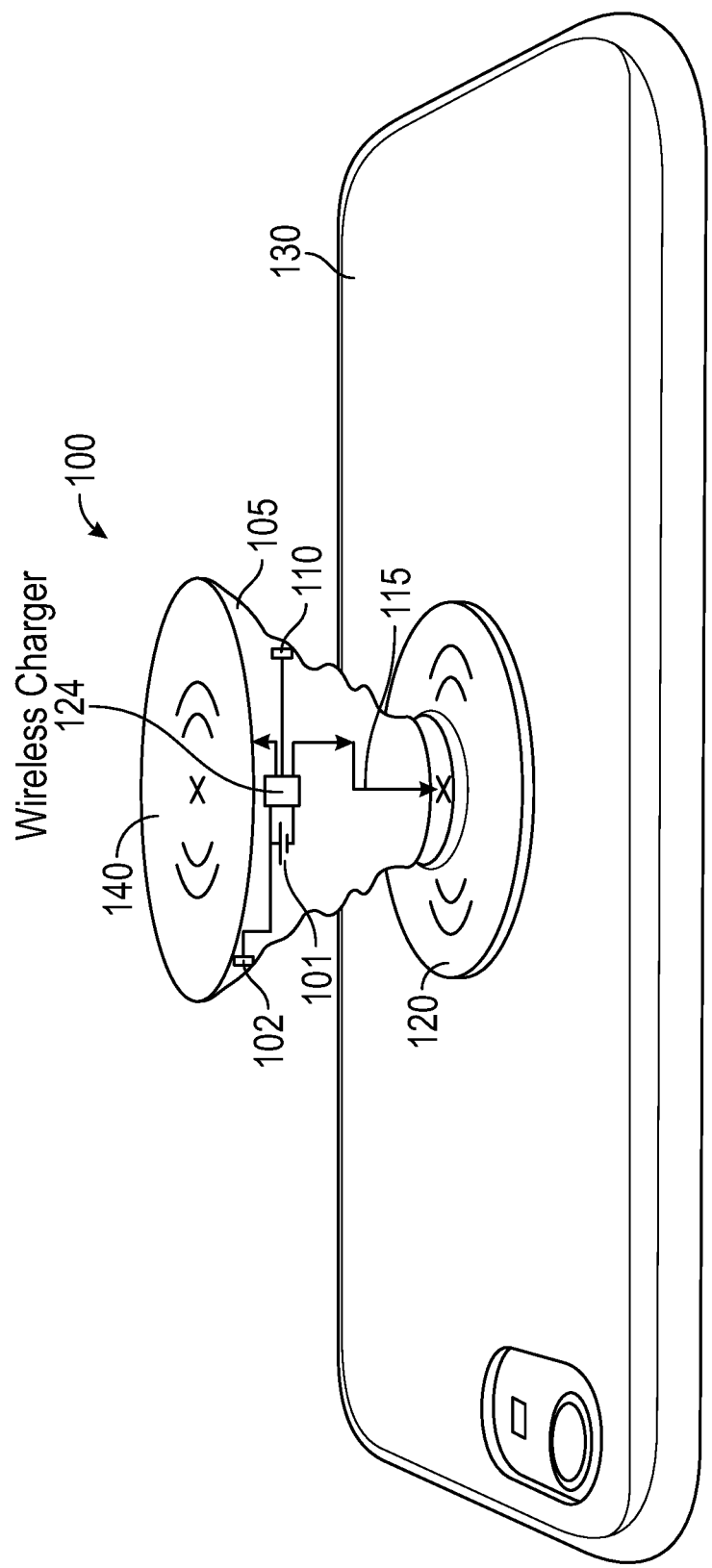
FIG. 1 shows a dual sided charger in the shape of a pop socket.

In one embodiment, shown in FIG. 1, the charge sharing battery 100 is configured in the shape of a pop socket. The pop socket 100 includes a top cylindrical disk shaped structure 105 including a battery 101 therein which stores charge. The cylindrical structure 105 includes a charging port 110 through which the battery 101 can be charged, for example using a USB charger or other kind of charger.

The output of the battery 101 is connected through the stem 115 of the pop socket, which can be for example a cylindrical or rectangular stem, to a wireless charging pad 120. A wireless charging circuit 124, which can be a "Qi" format circuit, takes the charge from the battery and produces a wireless charging output to the two wireless pads 140 and 120.

The wireless charging pad 120 is connected to, or otherwise located near the rear surface of a cellular phone 130. In an embodiment, the wireless charging pad 120 is attached to the phone case or to the phone itself, in a location where it can charge the cellular phone wirelessly. In one embodiment, for example, the wireless charging pad 120 may be attached via an adhesive. The battery/pop socket 100 can also be attached by clips, or by using a magnetic connector.

In one embodiment, the battery/pop socket 100 can include an on-off switch 102, which can be turned on to enable the wireless charging circuit, and turned off to prevent the battery 101 from charging the phone—in which case the device 100 acts simply as a pop socket. This switch is only necessary in the situation where the wireless charging pad is permanently attached to the phone. In other situations, where the wireless charging pad 120 can be temporarily attached, the device 100 may be configured to always charge when a phone or other such device with wireless charging capability comes within range of the charging pad 120.

In this embodiment, an additional wireless charging wireless charging pad 140 is located on the opposite end of the battery pack 100, forming a second side to the wireless charger, thus forming a dual sided wireless charger. In this way, a second user can locate their phone on the opposite side 140, so that the two phones are in essence located back to back with both of the phones being charged from the same battery 100.

In one embodiment, this dual sided wireless charger has a first side 120 that is facing in a first direction towards the user's phone, and a second side 140 which is facing in the opposite direction away from the user's phone so that the two phones can be placed back to back and charge from the same battery 100.

In other embodiments, The dual sided wireless charger can take multiple forms as described herein, with a fixed second side charger, or a movable second side charger that is attached via a wire.

Figure 2:
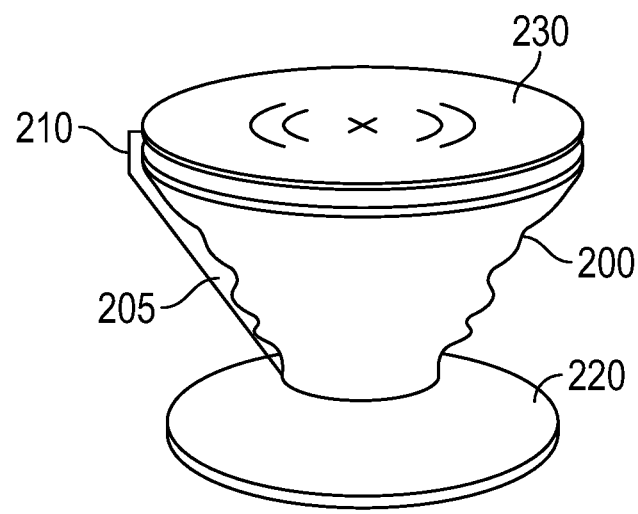
FIG. 2 shows another pop socket.
Figure 3:
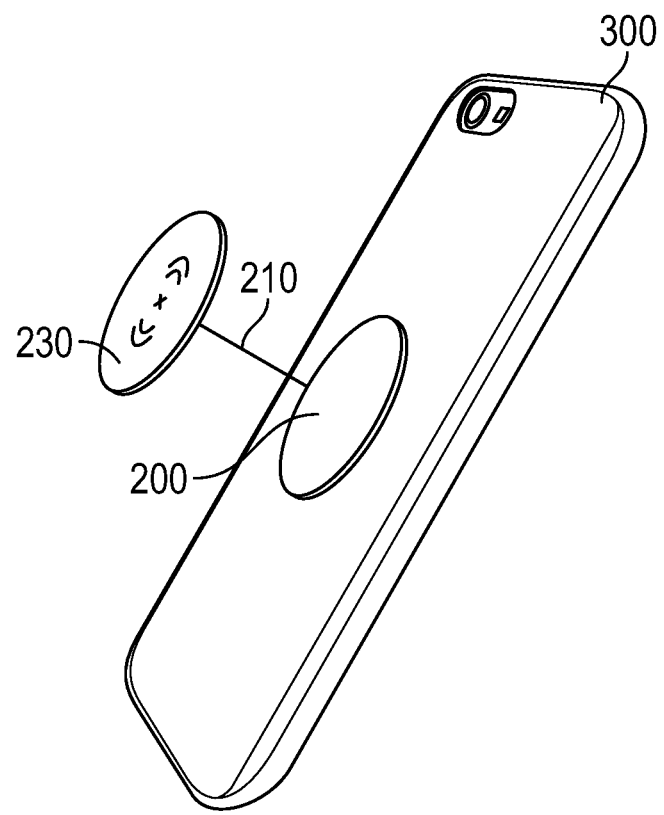
FIG. 3 shows a charger which can extend from one phone using the wire, to provide a charge location for another wirelessly chargeable phone.

In an alternative embodiment, shown in FIG. 2, the battery and its casing 200 is again configured as a pop socket with a wireless charging pad 220 connected to the user's phone. A second wireless charging pad 230 is connected to the battery via a wire 210. The wire 210 in one embodiment can be a retractable wire which retracts in and out of a spring-loaded retraction mechanism 205 that is located within the battery compartment. In this way, the user's phone 300 shown in FIG. 3 can be charged by the battery pack 200. The second wireless charging pad 230 can be extended from the battery system 200 by extending the wire 210. In this way, two users can still share charge, but the two phones can be separated by a further distance.

In another embodiment, the wire might not be retractable, and can for example be wound around a wire spool.

Figure 4:
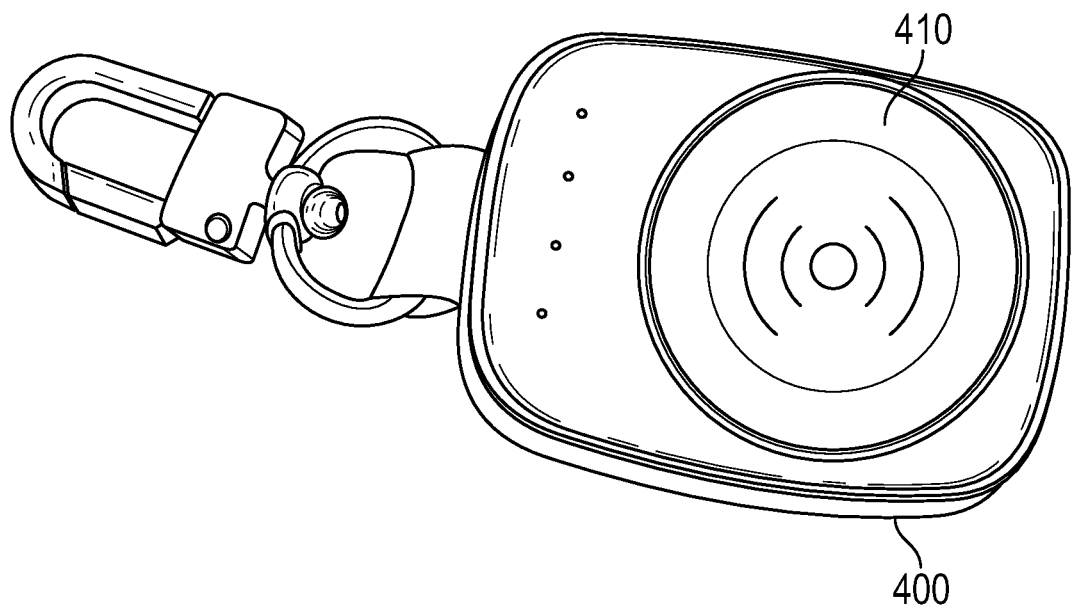
FIG. 4 shows a keychain size wireless charger.

In yet another embodiment, the portable battery can be in a different kind of package, for example in a rectangular package as shown in FIG. 4. In this embodiment, the package 400 includes a battery therein, and a wireless charging pad 410 on the first side. The second side can include, as in the first embodiment, either a wireless charging pad permanently attached, in which case the two phones need to be charged back to back, or a wireless charging pad connected via a wire that can be extended away from the wireless charging pad.

Figure 5:
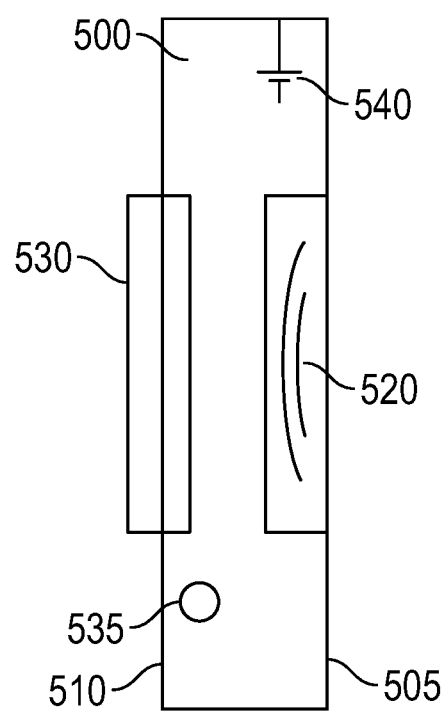
FIG. 5 shows a battery pack with two wireless charging parts.

In another embodiment, shown in FIG. 5, the power pack 500 can be in the shape of a cellular phone, e.g. rectangular with large flat surfaces on the front side 505, and the backside 510. This can be a dedicated power bank, or a cellular phone case. In an embodiment, both the front and back sides have charging pads that each provide charge from an internal battery 540. The front side 505 has a built-in charging pad shown as 520. The rear side charging pad can be either built-in like the front side charging pad 520, or can be a detachable charging pad shown as 530, which is attached to the battery pack 500 via a retractable cord 535. Thus, in this embodiment, there are 2 different charging pads associated with the same battery. One of the charging pads may be fixed and is intended for charging the main phone. The other of the charging pads may either be fixed on the rear side (510) or may be movable on a wire 535; either a free wire or a retractable wire as in the other embodiments.

In another embodiment, the battery pack can be a single-sided battery pack that is attachable to the phone by some mechanism e.g. by a suction cup or by magnetic attachment, and can be removed from the phone and attached to another phone.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A dual sided wireless charger comprising:
    a housing;
    a battery, in the housing;
    a first side wireless charger, connected to the housing and having a first charging pad facing in a first direction;
    a second side wireless charger, having a second charging pad separated from the first charging pad, the second charging pad connected to the battery by a flexible and movable wire, where the second charging pad is removable from the housing and movable to different positions relative to the housing, and receiving power over the flexible wire;
    a wireless charging circuit, providing power supplied by the battery, to both of the first side wireless charger and the second side wireless charger over the flexible wire, to provide a source of wireless charging from the battery to both of the first side wireless charger and the second side wireless charger, and allow the second side wireless charger to be moved to different positions relative to the first side wireless charger.

2. The charger as in claim 1, wherein the second side wireless charger faces in an opposite direction from the first side wireless charger.

3. The charger as in claim 2, wherein the dual sided wireless charger is in the shape of a pop socket.

4. The charger as in claim 3, where a first side of the pop socket includes
    a first flat side having the first side wireless charger therein, adapted to be pressed against a user's phone,
    a pop socket column, having a first side connected to the first flat side, and a second flat side attached to an other side of the pop socket column, and presenting a second flat side forming the second side wireless charger, with the first side wireless charger charging the user's phone, and the second side wireless charger wirelessly charging item other than the user's phone and allowing the another item to be moved to different positions relative to the pop socket column.

5. The charger as in claim 1, wherein the wire is a retractable wire that extends when the second charging pad is moved to a position more distant, and retracts when the second side charging pad is moved to a closer position.

6. The charger as in claim 5, wherein the wire is spring-loaded to retract automatically.

7. A battery power pack, comprising:
    a powerpack housing, having a shape, and having a front side surface sufficient in size to form a wireless charging pad, and having a rear side surface;
    a battery power source, inside the powerpack housing;
    a first charging pad, built into the front side surface, receiving power from the battery power source, and providing the power as a wireless power charge to a wireless chargeable device that is brought into proximity with the front surface; and
    a second charging pad, located on the rear side surface, and detachable from the rear side surface of the powerpack housing and movable relative to the rear side surface, the second charging pad attached by a flexible and movable wire and also receiving power from the battery power source and providing power as a wireless power charge to a second wireless chargeable device brought into proximity with the second charging pad.

8. The battery powerpack as in claim 7, wherein the wire is a retractable wire that extends when the second charging pad is moved to a position more distant, and retracts when the second side charging pad is moved to a closer position.

9. The power battery powerpack as in claim 7, wherein the wire is spring-loaded into its retracted position to retract automatically.

* * * * *